(12) United States Patent
Oowada

(10) Patent No.: US 11,874,484 B2
(45) Date of Patent: Jan. 16, 2024

(54) POLARIZING PLATE, METHOD OF MANUFACTURING THE SAME, AND OPTICAL APPARATUS

(71) Applicant: Dexerials Corporation, Tokyo (JP)

(72) Inventor: Masahiro Oowada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 354 days.

(21) Appl. No.: 16/970,480

(22) PCT Filed: Feb. 13, 2019

(86) PCT No.: PCT/JP2019/005144
§ 371 (c)(1),
(2) Date: Aug. 17, 2020

(87) PCT Pub. No.: WO2019/159982
PCT Pub. Date: Aug. 22, 2019

(65) Prior Publication Data
US 2020/0371277 A1    Nov. 26, 2020

(30) Foreign Application Priority Data

Feb. 19, 2018  (JP) .................................. 2018-026747

(51) Int. Cl.
*G02B 5/30* (2006.01)
*G03B 21/00* (2006.01)
*G03B 21/14* (2006.01)

(52) U.S. Cl.
CPC .......... *G02B 5/3058* (2013.01); *G03B 21/006* (2013.01); *G03B 21/14* (2013.01)

(58) Field of Classification Search
CPC .. G02B 5/3058; G02B 5/0858; G03B 21/006; G03B 21/14; G02F 1/1335
See application file for complete search history.

(56) References Cited

U.S. PATENT DOCUMENTS

| 6,122,103 A | 9/2000 | Perkins et al. |
| 6,252,709 B1 * | 6/2001 | Sato ..................... G02B 5/3058 |
| | | 427/163.1 |

(Continued)

FOREIGN PATENT DOCUMENTS

| JP | 2005-37900 A | 2/2005 |
| JP | 2010-530994 A | 9/2010 |

(Continued)

OTHER PUBLICATIONS

Office Action issued in the counterpart Chinese Patent Application No: 201980011250.6, dated Sep. 2, 2021 (16 pages).

(Continued)

*Primary Examiner* — Wyatt A Stoffa
*Assistant Examiner* — Ray Alexander Dean
(74) *Attorney, Agent, or Firm* — Osha Bergman Watanabe & Burton LLP

(57) ABSTRACT

Provided is a polarizing plate 1 having a wire grid structure, the polarizing plate 1 comprising: a transparent substrate 10; and grid protrusions 11 provided over the transparent substrate 10, arranged in an array having a pitch shorter than a wavelength of light in a band to be used, and extending in a predetermined direction, the grid protrusions 11 having a reflective layer 13, a dielectric layer 14, and an absorptive layer 15 that are disposed in this order in a direction away from the transparent substrate 10, and the reflective layer 13 having a maximum width b that is smaller than each of a maximum width of the dielectric layer and a maximum width of the absorptive layer (grid width a). This makes it possible to provide a polarizing plate capable of controlling the wavelength dispersion of absorption axis reflectance more accurately.

10 Claims, 4 Drawing Sheets

(56) References Cited

U.S. PATENT DOCUMENTS

| | | | |
|---|---|---|---|
| RE45,642 E * | 8/2015 | Takada | G03B 21/008 |
| 2004/0264350 A1 | 12/2004 | Ueki et al. | |
| 2010/0103517 A1* | 4/2010 | Davis | C23C 14/04 |
| | | | 359/485.05 |
| 2012/0224148 A1* | 9/2012 | Natsumeda | G02B 5/008 |
| | | | 353/30 |
| 2013/0286358 A1 | 10/2013 | Takahashi et al. | |
| 2015/0015948 A1* | 1/2015 | Takada | G02B 5/3058 |
| | | | 216/2 |
| 2016/0054497 A1* | 2/2016 | Takahashi | G02B 5/3058 |
| | | | 216/13 |
| 2018/0180785 A1 | 6/2018 | Takeda | |

FOREIGN PATENT DOCUMENTS

| | | |
|---|---|---|
| JP | 2012-181420 A | 9/2012 |
| JP | 2013-80230 A | 5/2013 |
| JP | 2016126291 A * 7/2016 | G02B 5/3033 |
| JP | 6230689 B1 | 11/2017 |
| WO | 2009/002791 A1 | 12/2008 |

OTHER PUBLICATIONS

International Search Report issued in Application No. PCT/JP2019/005144, dated May 14, 2019 (5 pages).
Written Opinion issued in International Application No. PCT/JP2019/005144, dated May 14, 2019 (4 pages).
Notice of Reasons for Rejection issued in Japanese Application No. 2018-026747, dated May 8, 2018 (3 pages).
Office Action issued in counterpart Chinese Patent Application No. 201980011250.6 dated Jan. 19, 2023 (8 pages).
Office Action issued in the counterpart Chinese Patent Application No. 201980011250.6, dated Aug. 24, 2022 (11 pages).
Office Action issued in the counterpart Chinese Patent Application no. 201980011250.6, dated Mar. 15, 2022 (14 pages).

* cited by examiner

POLARIZING PLATE, METHOD OF MANUFACTURING THE SAME, AND OPTICAL APPARATUS

TECHNICAL FIELD

The present invention relates to a polarizing plate, a method of manufacturing the polarizing plate, and an optical apparatus.

BACKGROUND ART

A polarizing plate is an optical element that absorbs polarized light in an absorption axis direction and transmits polarized light in a transmission axis direction perpendicular to the absorption axis direction. In recent years, wire grid-type inorganic polarizing plates have begun to be adopted, in place of organic polarizing plates, in optical apparatuses required to have heat resistance, such as liquid crystal projectors.

The inorganic polarizing plate is composed of a reflective layer, a dielectric layer, and an absorptive layer that are disposed in this order in a direction away from a transparent substrate. These inorganic layers are formed by a physical film-forming method or the like, and a polarizer pattern of a wire grid shape is formed by a photolithography-dry etching technique or the like.

Meanwhile, the light source spectra of liquid crystal projectors may differ from manufacturer to manufacturer. The channel wavelengths in the visible region that constitute 3LCD (Liquid Crystal Display) may also differ from manufacturer to manufacturer. Therefore, polarizing plates are required which have optical properties optimum for, and matching to, the channel wavelengths of the respective manufacturers.

Absorption axis reflectance properties constitute a characteristic of a polarizing plate. In general, wavelength dispersion of the absorption axis reflectance properties is controlled by way of adjustment of the thicknesses of a dielectric layer and an absorptive layer, whereby channel control is performed in the visible region. At this time, the thicknesses of the dielectric layer and the absorptive layer are adjusted such that the absorption axis reflectance is minimized in a channel wavelength range to be selected. Therefore, a special design is developed in terms of optical design.

Patent Document 1: Japanese Unexamined Patent Application, Publication No. 2013-80230

DISCLOSURE OF THE INVENTION

Problems to be Solved by the Invention

In general, the inorganic layers constituting the inorganic polarizing plate are designed to have rectangular cross sections having the same dimension in a width direction, and are shaped by the above-described physical etching technique. However, during the shaping process, the absorptive layer located at the end of the polarizer is constantly etched by the physical etching, and the thickness and volume of the absorptive layer fluctuate depending on variation in a degree of vacuum and gas pressure control of an etching device. As a result, the wavelength range where the absorption axis reflectance properties are minimized also fluctuates. Thus, it has been difficult to achieve absorption axis reflectance properties optimum for the channel wavelength range of each manufacturer.

The present invention has been made in view of the background described above, and is intended to achieve an object to provide a polarizing plate whose wavelength dispersion of absorption axis reflectance is controllable more accurately.

Means for Solving the Problems

To achieve the above object, the present invention provides a polarizing plate (e.g., a polarizing plate 1 to be described later) having a wire grid structure. The polarizing plate includes: a transparent substrate (e.g., a transparent substrate 10 to be described later); and grid protrusions (e.g., grid protrusions 11 to be described later) provided over the transparent substrate, arranged in an array having a pitch shorter than a wavelength of light in a band to be used, and extending in a predetermined direction. The grid protrusions have a reflective layer (e.g., a reflective layer 13 to be described later), a dielectric layer (a dielectric layer 14 to be described later), and an absorptive layer (e.g., an absorptive layer 15 to be described later) that are disposed in this order in a direction away from the transparent substrate. The reflective layer has a maximum width (e.g., a width b of the reflective layer to be described later) that is smaller than each of a maximum width of the dielectric layer and a maximum width of the absorptive layer (e.g., a grid-protrusion width a to be described later).

The maximum width of the dielectric layer may be substantially equal to the maximum width of the absorptive layer.

The dielectric layer may have a thickness of 1 nm to 50 nm.

The absorptive layer may have a thickness of 10 nm to 50 nm.

The transparent substrate may be transparent to the wavelength of the light in the band to be used, and may be made of glass, quartz, or sapphire.

The reflective layer may be made of aluminum or an aluminum alloy.

The dielectric layer may be made of a Si oxide.

The absorptive layer may be composed of Si as well as Fe or Ta.

The polarizing plate may have a surface covered with a protection film (e.g., a protective dielectric film 20 to be described later) made of a dielectric material, the surface being configured to receive incident light.

The polarizing plate may have a surface covered with an organic water-repellent film, the surface being configured to receive incident light.

The present invention further provides a method of manufacturing a polarizing plate having a wire grid structure. The method includes: forming a reflective layer over a transparent substrate; forming a dielectric layer on the reflective layer; forming an absorptive layer on the dielectric layer; and etching a resultant laminate in a selective manner to form, over the transparent substrate, grid protrusions arranged in an array having a pitch shorter than a wavelength of light in a band to be used, and extending in a predetermined direction. The etching includes making a maximum width of the reflective layer smaller than a maximum width of the dielectric layer and a maximum width of the absorptive layer.

The etching may further include adjusting the maximum width of the reflective layer such that an absorption axis reflectance is minimized in a wavelength range of the light in the band to be used.

The present invention further provides an optical apparatus including the polarizing plate having any of the above described features.

Effects of the Invention

The present invention provides a polarizing plate whose wavelength dispersion of the absorption axis reflectance is controllable more accurately.

PREFERRED MODE FOR CARRYING OUT THE INVENTION

An embodiment of the present invention will be described in detail with reference to the drawings.

[Polarizing Plate]

A polarizing plate according to an embodiment of the present invention is an inorganic polarizing plate having a wire grid structure, and includes: a transparent substrate; and grid protrusions provided over the transparent substrate, arranged in an array having a pitch (a cycle) shorter than a wavelength of light in a band to be used, and extending in a predetermined direction. The grid protrusions have a reflective layer, a dielectric layer, and an absorptive layer that are disposed in this order in a direction away from the transparent substrate.

Figure 1:
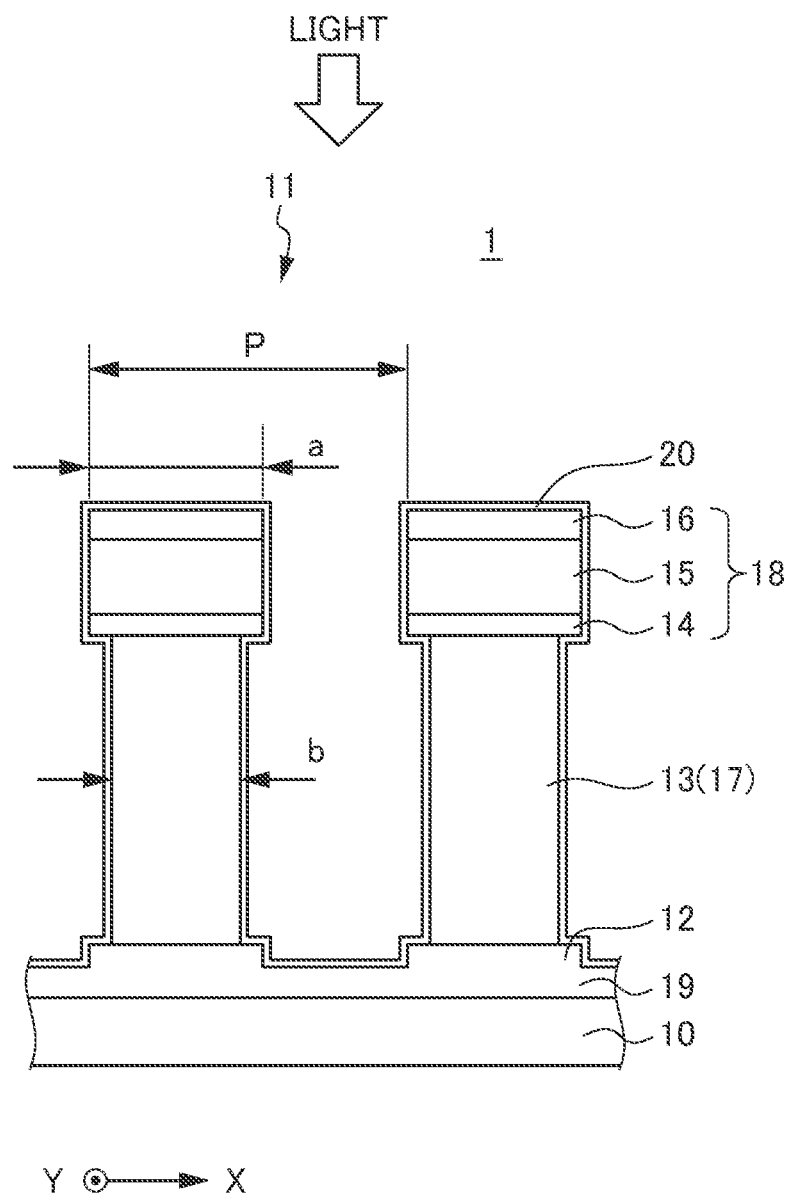
FIG. 1 is a schematic cross-sectional view showing a polarizing plate according to an embodiment of the present invention.

FIG. 1 is a schematic cross-sectional view showing a polarizing plate 1 according to an embodiment of the present invention. As shown in FIG. 1, the polarizing plate 1 includes: a transparent substrate 10 that is transparent to light in a band to be used; and grid protrusions 11 that are provided over one surface of the transparent substrate 10, and arranged in an array having a pitch shorter than a wavelength of the light in the band to be used. The grid protrusions 11 have a base 12, a reflective layer 13, a dielectric layer 14, an absorptive layer 15, and a dielectric layer 16 that are disposed in this order in a direction away from the transparent substrate 10. That is, the polarizing plate 1 has a wire grid structure in which the grid protrusions 11, which have been formed by stacking the base 12, the reflective layer 13, the dielectric layer 14, the absorptive layer 15, and the dielectric layer 16 in this order in the direction away from the transparent substrate 10, are arrayed to form a one-dimensional grid over the transparent substrate 10.

Here, as shown in FIG. 1, the direction (predetermined direction) in which the grid protrusions 11 extend is defined as a Y-axis direction. A direction which is perpendicular to the Y-axis direction, and in which the grid protrusions 11 are arrayed along the main surface of the transparent substrate 10 is defined as an X-axis direction. In this case, it is favorable that on the side of the transparent substrate 10 having the grid protrusions 11 formed thereon, light in a direction perpendicular to the X-axis direction and the Y-axis direction is incident in the polarizing plate 1.

With the help of four actions, namely, transmission, reflection, interference, and selective light absorption of a polarized light wave due to optical anisotropy, the polarizing plate 1 attenuates a polarized light wave (TE wave (S wave)) having an electric field component parallel to the Y-axis direction, and transmits a polarized light wave (TM wave (P wave)) having an electric field component parallel to the X-axis direction. Thus, the Y-axis direction is the direction of an absorption axis of the polarizing plate 1, whereas the X-axis direction is the direction of a transmission axis of the polarizing plate 1.

Light incident from the side of the polarizing plate 1 where the grid protrusions 11 are formed is partially absorbed when passing through the dielectric layer 16, the absorptive layer 15, and the dielectric layer 14, whereby the light is attenuated. A polarized light wave (TM wave (P wave)) of the light that has been transmitted through the dielectric layer 16, the absorptive layer 15, and the dielectric layer 14 passes through the reflective layer 13 with a high transmittance. On the other hand, a polarized light wave (TE wave (S wave)) of the light that has been transmitted through the dielectric layer 16, the absorptive layer 15, and the dielectric layer 14 is reflected by the reflective layer 13. The TE wave reflected by the reflective layer 13 is partially absorbed when passing through the dielectric layer 16, the absorptive layer 15, and the dielectric layer 14, and is partially reflected back to the reflective layer 13. Further, when passing through the dielectric layer 16, the absorptive layer 15, and the dielectric layer 14, the TE wave reflected by the reflective layer 13 undergoes interference, and thus, is attenuated. The polarizing plate 1 selectively attenuates the TE wave in this way, whereby desired polarization properties are achieved.

As shown in FIG. 1, the grid protrusions 11 have a rectangular base 12, a rectangular grid-protrusion leg 17, and a rectangular grid-protrusion end 18, when viewed in the direction (hereinafter, referred to as the predetermined direction) in which the one-dimensional grid extends, i.e., when viewed in a cross section taken along a direction perpendicular to the predetermined direction. However, the base 12, the grid-protrusion leg 17, and the grid-protrusion end 18 are not limited to the rectangular shape, and may have any shape. For example, the grid-protrusion end 18 of the grid protrusion 11 may be etched to have rounded corners or a tapered shape.

The grid-protrusion leg 17 is formed to extend vertically from the base 12. The grid-protrusion leg 17 is constituted by the reflective layer 13. That is, the boundary between the grid-protrusion leg 17 and the grid-protrusion end 18 is located at the boundary between the reflective layer 13 and the dielectric layer 14. As shown in FIG. 1, the grid-protrusion end 18 of the present embodiment has a rectangular shape when viewed in the predetermined direction. The grid-protrusion end 18 is constituted by the dielectric layer 14, the absorptive layer 15, and the dielectric layer 16. However, the dielectric layer 16 is not essential, and the grid-protrusion end 18 may be constituted by the dielectric layer 14 and the absorptive layer 15.

In the following description, the term "height direction" refers to a direction perpendicular to the main surface of the transparent substrate 10, whereas the term "width" refers to a dimension in the X-axis direction that is perpendicular to the height direction when viewed in the Y-axis direction in which the grid protrusions 11 extend. Further, when the polarizing plate 1 is viewed in the Y-axis direction in which the grid protrusions 11 extend, the grid protrusions 11 are arranged to be spaced apart from each other in a repeating cycle in the X-axis direction. The cycle is referred to as a pitch P.

The pitch P of the grid protrusions 11 is not particularly limited as long as it is shorter than the wavelength of the light in the band to be used. From the viewpoint of ease of fabrication and stability, the pitch P of the grid protrusions 11 is preferably 100 nm to 200 nm, for example. The pitch P of the grid protrusions 11 can be measured by way of an observation using a scanning electron microscope or a transmission electron microscope. For example, the pitch P can be measured at any four locations using a scanning electron microscope or a transmission electron microscope, and an arithmetic mean value of the measurements can be determined as the pitch P of the grid protrusions 11. Hereinafter, this measurement method is referred to as electron microscopy.

As shown in FIG. 1, a width of the grid-protrusion end 18 of the grid protrusion 11 in the X-axis direction is referred to as the grid-protrusion width a. The grid-protrusion width a is equal to the width in the X-axis direction of the dielectric layer 14, the absorptive layer 15, and the dielectric layer 16. Specifically, the grid-protrusion width a is preferably 35 nm to 45 nm. The grid-protrusion width a can be measured by, for example, electron microscopy as described above.

Here, in the present invention, in a case where each of the reflective layer 13 that constitutes the grid-protrusion leg 17, the dielectric layer 14, the absorptive layer 15, and the dielectric layer 16 that constitute the grid-protrusion end 18, and the base 12 to be described later has a non-rectangular shape the width of which varies in the height direction, the width of each layer in the X-axis direction means the maximum width of the layer in the X-axis direction. In this case, the grid-protrusion width a described above means the maximum width of the grid-protrusion end 18 in the X-axis direction.

In particular, the dielectric layer 14 and the absorptive layer 15 suitably have a shape which is smaller in volume than a rectangular shape according to a design structure satisfying the desired optical properties, and which can satisfy the optical properties.

The transparent substrate 10 is not particularly limited as long as it is transparent to light in the band to be used, and can be selected as appropriate according to a purpose. As used herein, "being transparent to light in the band to be used" does not mean having a transmittance of 100% with respect to the light in the band to be used. It is suitable to have a transparency allowing the function as a polarizing plate to be ensured. The light in the band to be used is, for example, visible light having a wavelength of about 380 nm to about 810 nm.

The main surface of the transparent substrate 10 is not limited to any particular shape and may have a shape (e.g., a rectangular shape) selected as appropriate according to a purpose. Preferably, the transparent substrate 10 has an average thickness of, for example, 0.3 mm to 1 mm.

The transparent substrate 10 is preferably made of a material having a refractive index of 1.1 to 2.2, and examples of the material include glass, quartz, and sapphire. From the viewpoint of cost and transmittance, it is preferable to use glass, in particular, quartz glass (with a refractive index of 1.46) or soda-lime glass (with a refractive index of 1.51). The component composition of the glass material is not particularly limited. For example, it is possible to use an inexpensive glass material, such as silicate glass, that is widely distributed as an optical glass.

From the viewpoint of thermal conductivity, it is preferable to use crystal or sapphire having a high thermal conductivity. With use of crystal or sapphire, a high light resistance to strong light is obtained, so that the resultant polarizing plate is preferably usable as a polarizing plate for an optical engine of a projector generating considerable heat.

In the case of using a transparent substrate made of an optically active crystal such as quartz, it is preferable to arrange the grid protrusions 11 in a direction parallel or perpendicular to an optical axis of the crystal. In this way, excellent optical properties can be obtained. Here, the optical axis refers to such a direction axis that a difference in refractive index between O (ordinary ray) and E (extraordinary ray) of light traveling along the direction axis is minimized.

The shape of the transparent substrate 10 is not particularly limited, and may be, for example, the shape of a wafer of ϕ6 inches or ϕ8 inches. In a case where the transparent substrate 10 has such a wafer shape, the transparent substrate 10 on which the grid protrusions 11 have been formed is cut into dimensions as desired with a scribing device or the like, whereby the polarizing plate 1 is obtained which has, for example, a rectangular shape.

As shown in FIG. 1, the base 12 of the present embodiment has a rectangular shape when viewed in the direction (predetermined direction) in which the one-dimensional grid extends, i.e., when viewed in a cross section taken along a direction perpendicular to the predetermined direction.

The width of the base 12 in the X-axis direction is preferably equal to or larger than the width of the reflective layer 13. These widths can be measured by, for example, electron microscopy as described above.

The thickness of the base 12 is not particularly limited, and is preferably 10 nm to 100 nm, for example. The thickness of the base 12 can be measured by, for example, electron microscopy as described above.

The base 12 is constituted by a dielectric film disposed on the transparent substrate 10 and extending in the shape of strips in the Y-axis direction as the absorption axis. Preferably, a material forming the base 12 is transparent to the light in the band to be used, and has a refractive index smaller than the transparent substrate 10. Among such materials, a Si oxide such as $SiO_2$ is preferred.

For example, the base 12 can be formed by changing a balance between isotropic etching by dry etching and anisotropic etching in a stepwise manner, with respect to an undercoat layer 19 that consists of the above-described dielectric and is formed on the transparent substrate 10. In this case, as shown in FIG. 1, the base 12 is provided on the undercoat layer 19 formed on the transparent substrate 10.

The reflective layer 13 is formed on the base 12, and is constituted by a metallic film extending in the shape of strips in the Y-axis direction as the absorption axis. More specifically, as shown in FIG. 1, the reflective layer 13 of the present embodiment extends vertically from the base 12, and has a rectangular shape when viewed in the predetermined direction, i.e., when viewed in a cross section taken along a direction perpendicular to the predetermined direction. The reflective layer 13 functions as a wire grid-type polarizer, and attenuates a polarized light wave (TE wave (S wave)) having an electric field component parallel to a longitudinal direction of the reflective layer 13, and transmits a polarized light wave (TM wave (P wave)) having an electric field component perpendicular to the longitudinal direction of the reflective layer 13.

A material forming the reflective layer 13 is not particularly limited as long as it is reflective to the light in the band to be used. Examples of the material include elements of each of Al, Ag, Cu, Mo, Cr, Ti, Ni, W, Fe, Si, Ge, Te, etc., and alloys containing one or more of the foregoing elements. Among these, aluminum or an aluminum alloy is preferable as the material forming the reflective layer 13. Apart from these metallic materials, the reflective layer 13 may be made of a non-metallic inorganic film having a surface with a high reflectance due to, for example, coloring, or a resin film having such a surface with a high reflectance.

The thickness of the reflective layer 13 is not particularly limited, and is preferably 100 nm to 300 nm, for example. The thickness of the reflective layer 13 can be measured by, for example, electron microscopy as described above.

Preferably, the reflective layer 13 has, in the X-axis direction, a width b equal to or smaller than the width of the base 12. The width b of the reflective layer 13 is designed to be smaller than the grid-protrusion width a (the width of the dielectric layer 14, the absorptive layer 15). The width b of the reflective layer 13 can be measured by, for example, the electron microscopy described above.

As will be detailed later, the width b of the reflective layer 13 can made smaller than the width of the base 12 and the grid-protrusion width a by, for example, isotropic etching by wet etching or additional wet etching. By controlling the width b of the reflective layer 13, which reflects light as described above, the area of the reflective layer 13 as viewed in the direction of incidence of light is increased or reduced, whereby a quantity of the light reflected by the reflective layer 13 is increased or reduced. Thus, controlling a ratio of the width b of the reflective layer 13 to the grid-protrusion width a enables control of the light transmission properties of the polarizing plate 1.

Further, designing the width b of the reflective layer 13 to be smaller than the grid-protrusion width a (the width of the dielectric layer 14, the width of the absorptive layer 15) makes it possible to shift the wavelength dispersion of an absorption axis reflectance Rs to longer wavelengths. Here, the absorption axis reflectance Rs means a reflectance of polarized light that travels in the absorption axis direction (Y-axis direction) and is incident on the polarizing plate 1. The absorption axis reflectance Rs is characterized in that it is minimized in a certain wavelength range of the visible region. That is, a curve obtained by plotting the absorption axis reflectance Rs relative to the wavelength has a valley representing a minimum peak (see FIGS. 2 to 4 to be described later). That is, in the present embodiment, by designing the width b of the reflective layer 13 to be smaller than the grid-protrusion width a (the width of the dielectric layer 14, the width of the absorptive layer 15), the wavelength range where the absorption axis reflectance Rs is minimized can be shifted in terms of wavelength to longer wavelengths, whereby the absorption axis reflectance Rs of the polarizing plate 1 can be accurately controlled.

The dielectric layer 14 is formed on the reflective layer 13, and is constituted by a dielectric film extending in the shape of strips in the Y-axis direction as the absorption axis. The dielectric layer 14 has a thickness due to which the phase of polarized light transmitted through the absorptive layer 15 and reflected by the reflective layer 13 is shifted by half a wavelength, with respect to polarized light reflected by the absorptive layer 15. Specifically, the thickness of the dielectric layer 14 is appropriately set within the range from 1 nm to 500 nm, in which range the phase of the polarized light can be adjusted to enhance an interference effect. More preferably, the range of the thicknesses is from 1 nm to 50 nm. The thickness of the dielectric layer 14 can be measured by, for example, electron microscopy as described above.

The dielectric layer 14 is made of a commonly-used material, examples of which include Si oxides such as $SiO_2$, metal oxides such as $Al_2O_3$, beryllium oxide, and bismuth oxide, $MgF_2$, cryolite, germanium, titanium dioxide, silicon, magnesium fluoride, boron nitride, a boron oxide, a tantalum oxide, carbon, and combinations thereof. Among these, the dielectric layer 14 is preferably made of a Si oxide.

The refractive index of the dielectric layer 14 is preferably greater than 1.0 and not greater than 2.5. Since the optical properties of the reflective layer 13 are also affected by the refractive index of the surroundings, the optical properties of the polarizing plate can be controlled by selecting the material for the dielectric layer 14. Further, appropriately adjusting the thickness and the refractive index of the dielectric layer 14 makes it possible that the TE wave, which has been reflected by the reflective layer 13, is partially reflected when being transmitted through the absorptive layer 15, and the reflected part is returned to the reflective layer 13, whereby light that has passed through the absorptive layer 15 can be attenuated by interference. This selective attenuation of the TE wave allows the desired polarization properties to be achieved.

The absorptive layer 15 is formed on the dielectric layer 14, and extends in the shape of strips in the Y-axis direction as the absorption axis. A material forming the absorptive layer 15 can be one or more types of materials, such as metallic materials and semiconductor materials, whose extinction coefficient of an optical constant is not zero and which exhibit a light-absorbing action. The material is appropriately selected depending on the wavelength range of the light to be applied. Examples of the metallic materials include elements of each of Ta, Al, Ag, Cu, Au, Mo, Cr, Ti, W, Ni, Fe, Sn, etc., and alloys containing one or more of the foregoing elements. Examples of the semiconductor materials include Si, Ge, Te, ZnO, and silicide materials (e.g., $\beta$-$FeSi_2$, $MgSi_2$, $NiSi_2$, $BaSi_2$, $CrSi_2$, $CoSi_2$, TaSi, etc.). Use of these materials allows the polarizing plate 1 to have a high extinction ratio with respect to the visible region to be applied. Among the above materials, the absorptive layer 15 is preferably composed of Si as well as Fe or Ta.

If the absorptive layer 15 is made of such a semiconductor material, the band gap energy of the semiconductor plays a part in the absorbing action. It is therefore required that the band gap energy be equal to or less than the band to be used. For example, in the case of use for visible light, it is necessary to use a material exhibiting absorption at a wavelength of 400 nm or more, i.e., having a band gap of 3.1 eV or less.

The thickness of the absorptive layer 15 is not particularly limited, and is preferably 10 nm to 100 nm, for example. More preferably, the thickness is within the range from 10 nm to 50 nm. The thickness of the absorptive layer 15 can be measured by, for example, electron microscopy as described above.

The absorptive layer 15 can be formed as a high-density film by vapor deposition or sputtering. Further, the absorptive layer 15 may be composed of two or more layers of different materials.

The dielectric layer 16 is made of a dielectric film. Like the absorptive layer 15, the dielectric layer 16 can be formed as a high-density film by vapor deposition or sputtering.

The polarizing plate 1 according to the present embodiment, which has the above-described configuration, may further have a diffusion barrier layer between the dielectric layer 14 and the absorptive layer 15. That is, in this case, the grid protrusions 11 have the base 12, the reflective layer 13, the dielectric layer 14, the diffusion barrier layer, the absorptive layer 15, and the dielectric layer 16 in this order in the direction away from the transparent substrate 10. The presence of the diffusion barrier layer prevents diffusion of light in the absorptive layer 15. The diffusion barrier layer is made of a metal film of Ta, W, Nb, Ti or the like.

As shown in FIG. 1, the polarizing plate 1 according to the present embodiment may have a protective dielectric film 20 covering the surface of the polarizing plate 1 configured to receive incident light. The protective dielectric film 20 can be formed by performing, for example, chemical vapor deposition (CVD) or atomic layer deposition (ALD) on the surface of the polarizing plate 1 (the surface having the wire grid formed thereon). Thus, the metal film 20 can be inhibited from undergoing an unnecessary oxidation reaction.

Furthermore, in the present embodiment, the surface of the polarizing plate 1 configured to receive incident light may be covered with an organic water-repellent film (not shown). The organic water-repellent film can be formed by, for example, the above-described CVD or ALD. Thus, the polarizing plate 1 can have enhanced reliability, such as improved moisture resistance.

The protective dielectric film 20 and the organic water-repellent film each have a considerably smaller thickness than the reflective layer 13, the dielectric layer 14, the absorptive layer 15, and any other layers. Therefore, when the protective dielectric film 20 and the organic water-repellent film are provided, the above-described grid-protrusion width a excludes the thicknesses of the protective dielectric film 20 and the organic water-repellent film.

[Method of Manufacturing Polarizing Plate]

A method of manufacturing the polarizing plate 1 according to the present embodiment includes an undercoat layer forming step, a reflective layer forming step, a dielectric layer forming step, an absorptive layer forming step, and an etching step.

In the undercoat layer forming step, an undercoat layer is formed on a transparent substrate 10. In the reflective layer forming step, a reflective layer is formed on the undercoat layer that has been formed in the undercoat layer forming step. In the dielectric layer forming step, a dielectric layer is formed on the reflective layer that has been formed in the reflective layer forming step. In the absorptive layer forming step, an absorptive layer is formed on the dielectric layer that has been formed in the dielectric layer forming step. In each of these layer forming steps, the respective layer can be formed by, for example, sputtering or vapor deposition.

In the dielectric layer forming step, the thickness of the dielectric layer 14 is set such that the minimum peak of the absorption axis reflectance Rs is positioned at shorter wavelengths than the visible region (hereinafter, referred to as the channel) to be selected. Likewise, in the absorptive layer forming step, the thickness of the absorptive layer 15 is set such that the minimum peak of the absorption axis reflectance Rs is positioned at shorter wavelengths than the visible region (hereinafter, referred to as the channel) to be selected. This is because, in the etching step to be described later, the reflective layer 13 is selectively etched to have the width b smaller than the grid-protrusion width a, so that the wavelength dispersion of the absorption axis reflectance Rs can be shifted to longer wavelengths.

In the etching step, the laminate formed through the above-described layer forming steps is selectively etched to form, over the transparent substrate 10, grid protrusions 11 arranged in an array having a pitch shorter than a wavelength of light in a band to be used. Specifically, a mask pattern in the shape of a one-dimensional grid is formed by, for example, photolithography or a nanoimprint method.

The laminate is then selectively etched, thereby forming, over the transparent substrate 10, the grid protrusions 11 arranged in an array having a pitch shorter than the wavelength of the light in the band to be used. A usable etching method is, for example, dry etching using an etching gas suitable for the etching target.

In particular, in the present embodiment, etching conditions (a gas flow rate, a gas pressure, an output, a cooling temperature of the transparent substrate) are optimized, whereby the width b of the reflective layer 13 is made smaller than the grid-protrusion width a (the width of the dielectric layer 14, the width of the absorptive layer 15). Specifically, the width b of the reflective layer 13 can be controlled by reactive etching (isotropic etching) in which a ratio of an etching gas for the dry etching of the reflective layer 13 is increased, for example. Alternatively, the width b of the reflective layer 13 can be controlled by additionally performing wet etching suitable for the reflective layer 13.

Specifically, for example, in the case where the reflective layer 13 is mainly made of Al, by way of immersion in an etchant containing hydrofluoric acid as a principal component, the reflective layer 13 is selectively etched to become narrow because of a difference in etching rate from the other inorganic layers. The undercoat layer 19 is etched by dry etching using an etching gas suitable for the etching target, so that a base 12 is formed which is rectangular as viewed in the direction in which the grid protrusions 11 extend.

Further, the method of manufacturing the polarizing plate 1 according to the present embodiment may include a step of coating the surface configured to receive incident light, with a protective dielectric film 20. Furthermore, the method of manufacturing the polarizing plate 1 according to the present embodiment may further include a step of coating the protective dielectric film 20 with an organic water-repellent film. The protective dielectric film 20 and the organic water-repellent film are formed by, for example, the above-described CVD or ALD. By way of the above-described steps, the polarizing plate 1 according to the present embodiment is manufactured.

[Optical Apparatus]

An optical apparatus according to the present embodiment includes the polarizing plate 1 according to the embodiment described above. Examples of the optical apparatus include a liquid crystal projector, a head-up display, and a digital camera. The polarizing plate 1 according to the present embodiment is an inorganic polarizing plate that is superior in heat resistance to an organic polarizing plate. Thus, the polarizing plate 1 is suitable for use in a liquid crystal projector, a head-up display, and the like for which heat resistance is required.

If the optical apparatus according to the present embodiment includes a plurality of polarizing plates, it is suitable that at least one of the plurality of polarizing plates is the polarizing plate 1 of the present embodiment. For example, when the optical apparatus according to the present embodiment is a liquid crystal projector, it is suitable that at least one of the polarizing plates disposed on an incident side and an emission side of a liquid crystal panel is the polarizing plate 1 of the present embodiment.

The polarizing plate 1, the method for manufacturing the polarizing plate 1, and the optical apparatus that have been described above exert the following effects.

In the present embodiment, the polarizing plate 1 with a wire grid structure includes the grid protrusions 11, which have the reflective layer 13, the dielectric layer 14, and the absorptive layer 15 in this order in the direction away from the transparent substrate 10. In the polarizing plate 1, the width b of the reflective layer 13 is made smaller than the grid-protrusion width a (the width of the dielectric layer 14, the width of the absorptive layer 15). This configuration makes it possible to control the wavelength dispersion of the absorption axis reflectance Rs more accurately. More specifically, the wavelength dispersion of the absorption axis reflectance Rs can be shifted to longer wavelengths, whereby a wavelength range where the absorption axis reflectance Rs is minimized can be shifted to longer wavelengths. Consequently, it is possible to more reliably obtain the polarizing plate 1 whose absorption axis reflectance Rs is controlled to be minimized.

Further, since accurate control of the wavelength dispersion of the absorption axis reflectance Rs is achieved by making the width b of the reflective layer 13 smaller than the grid-protrusion width a by etching, the respective thicknesses of the dielectric layer 14 and the absorptive layer 15 can be adjusted with a certain degree of flexibility within shorter wavelengths than the wavelength range of the liquid crystal projector of each manufacturer. Therefore, according to the present embodiment, optimum reflective properties can be achieved, without having to take account of special designs of the liquid crystal projector manufacturers, and regardless of variation in the thicknesses and shapes of the dielectric layer 14 and the absorptive layer 15, which can result from the manufacturing process. As a result, the present embodiment provides the polarizing plates having optimum optical properties for light source spectra that differ from manufacturer to manufacturer of liquid crystal projectors. At the same time, the polarizing plate provided by the present embodiment has an enhanced transmission axis transmittance Tp as compared with a basic design structure in which the width of a reflective layer is equal to a grid-protrusion width, and increases projection brightness of a liquid crystal projector.

Note that the present invention is not limited to the embodiment described above, and modifications and improvements within a range in which the object of the present invention is achievable are encompassed in the present invention. For example, the polarizing plate of the present embodiment is applicable to not only a liquid crystal projector, but also various uses.

EXAMPLES

Next, examples of the present invention will be described. It should be noted that the present invention is not limited to the following examples.

Examples 1 and 2, and Comparative Example 1

As Example 1, an inorganic polarizing plate according to the present embodiment shown in FIG. 1 and configured such that the width of the reflective layer corresponds to 88% of the grid-protrusion width (the width of the dielectric layer and the absorptive layer) was subjected to a simulation. As Example 2, an inorganic polarizing plate according to the present embodiment shown in FIG. 1 and configured such that the width of the reflective layer corresponds to 56% of the grid-protrusion width (the width of the dielectric layer and the absorptive layer) was subjected to a simulation. Further, as Comparative Example 1, an inorganic polarizing plate having the same configuration as in Examples 1 and 2 except that the width of the reflective layer is equal to the grid-protrusion width (the width of the dielectric layer and the absorptive layer) was subjected to a simulation.

More specifically, the optical properties of these inorganic polarizing plates were inspected in an electromagnetic field simulation by a rigorous coupled wave analysis (RCWA) method. In the simulation, a grating simulator "Gsolver" manufactured by Grating Solver Development Co. was used.

Figure 2:
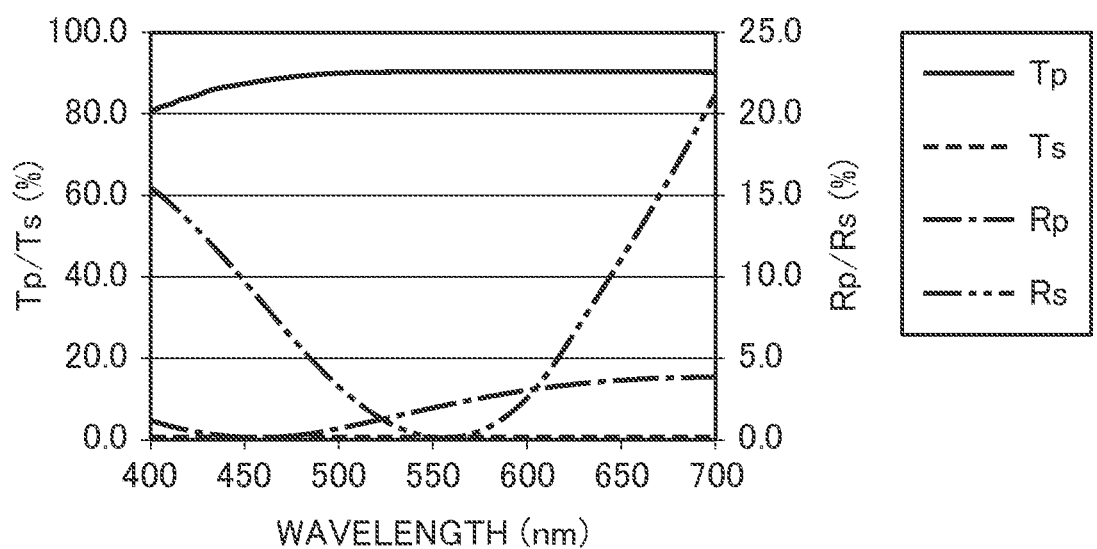
FIG. 2 is a graph showing optical properties of a polarizing plate of Example 1 in which the width of a reflective layer corresponds to 88% of a grid-protrusion width.
Figure 3:
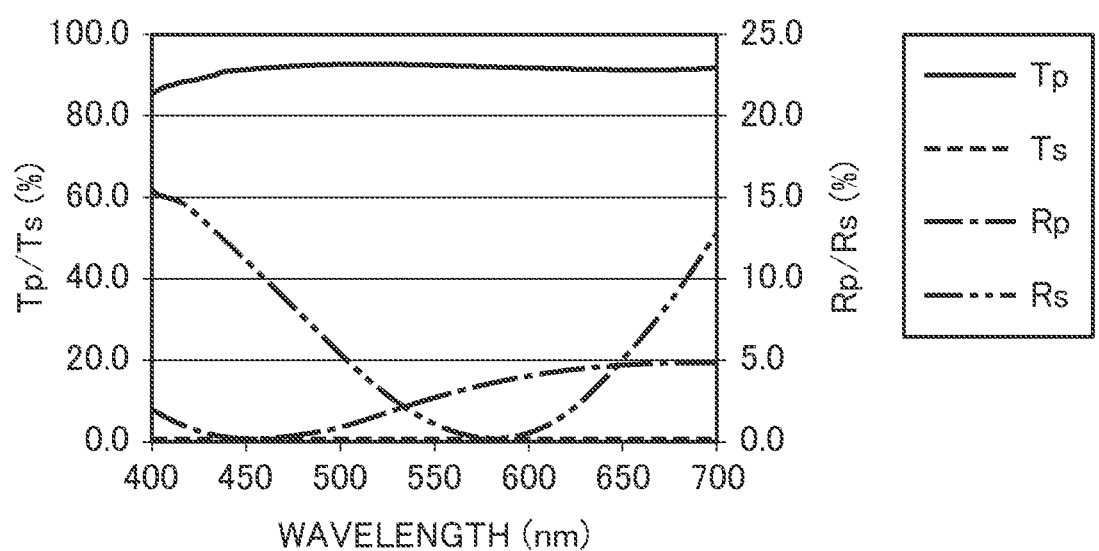
FIG. 3 is a graph showing optical properties of a polarizing plate of Example 2 in which the width of a reflective layer corresponds to 56% of a grid-protrusion width.
Figure 4:
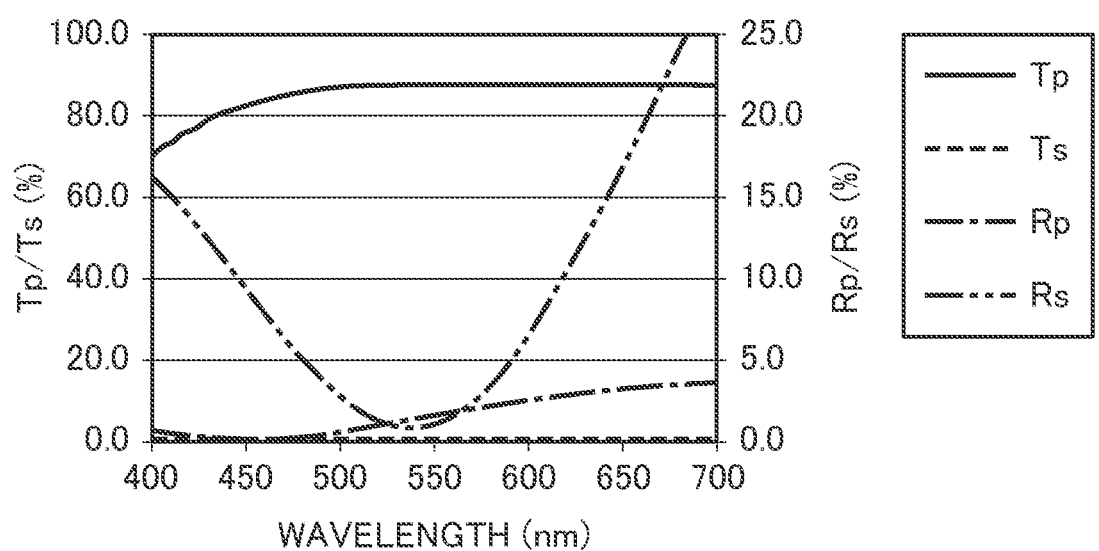
FIG. 4 is a graph showing optical properties of a polarizing plate of Comparative Example 1 in which the width of a reflective layer is equal to a grid-protrusion width.

FIG. 2 is a graph showing the optical properties of the inorganic polarizing plate of Example 1 in which the width of the reflective layer corresponds to 88% of the grid-protrusion width (the width of the dielectric layer and the absorptive layer). FIG. 3 is a graph showing the optical properties of the inorganic polarizing plate of Example 2 in which the width of the reflective layer corresponds to 56% of the grid-protrusion width (the width of the dielectric layer and the absorptive layer). FIG. 4 is a graph showing the optical properties of the inorganic polarizing plate of Comparative Example 1 in which the width of the reflective layer is equal to the grid-protrusion width (the width of the dielectric layer and the absorptive layer).

In FIGS. 2 to 4, the horizontal axis represents the wavelength $\lambda$ (nm), the left vertical axis represents the transmission axis transmittance Tp or the absorption axis transmittance Ts, and the right vertical axis represents the transmission axis reflectance Rp or the absorption axis reflectance Rs. Here, the transmission axis transmittance Tp refers to a transmittance of polarized light that travels in the transmission axis direction (X-axis direction) and is incident in the polarizing plate. The absorption axis transmittance Ts refers to a transmittance of polarized light that travels in the absorption axis direction (Y-axis direction) and is incident in the polarizing plate. The transmission axis reflectance Rp refers to a reflectance of polarized light that travels in the transmission axis direction (X-axis direction) and is incident in the polarizing plate. The absorption axis reflectance Rs refers to a reflectance of polarized light that travels in the absorption axis direction (Y-axis direction) and is incident in the polarizing plate, as described above.

A comparison of the absorption axis reflectance Rs between Examples 1 and 2 and Comparative Example 1 shows that the minimum peak of the absorption axis reflectance Rs of Comparative Example 1 is positioned at around 540 nm, whereas the minimum peak of the absorption axis reflectance Rs of Example 1 is positioned at around 560 nm. Thus, it was found that the minimum peak of the absorption axis reflectance Rs of Example 1 was shifted to longer wavelengths. Further, it was found that the minimum peak of the absorption axis reflectance Rs of Example 2 was at around 580 nm, and thus, was further shifted to longer wavelengths.

From these results, it has been confirmed that in the polarizing plate according to the present embodiment that has the reflective layer designed to have a smaller width than the grid-protrusion width, the wavelength dispersion of the absorption axis reflectance Rs can be more accurately controlled. More specifically, it has been confirmed that the wavelength range where the absorption axis reflectance Rs is minimized can be shifted in terms of wavelength to longer wavelengths, and consequently, the polarizing plate whose absorption axis reflectance Rs can be controlled to be minimized is obtained more reliably. Thus, the present invention provides the inorganic polarizing plate having the optimum optical properties for the required characteristics that differ from manufacturer to manufacturer of liquid crystal projectors.

In addition, a comparison of the transmission axis transmittance Tp between Examples 1 and 2 and Comparative Example 1 shows that the value of the transmission axis transmittance Tp of Examples 1 and 2 is improved as compared with that of Comparative Example 1. From this result, it has been confirmed that the polarizing plate of the present embodiment in which the width of the reflective layer is smaller than the grid-protrusion width is superior in the transmission axis transmittance Tp to the conventional basic design structure in which the width of the reflective layer is equal to the grid-protrusion width.

EXPLANATION OF REFERENCE NUMERALS

1: Polarizing Plate
10: Transparent Substrate
11: Grid Protrusion
12: Base
13: Reflective Layer
14: Dielectric Layer
15: Absorptive Layer
16: Dielectric Layer
17: Grid-Protrusion Leg
18: Grid-Protrusion End
19: Undercoat Layer
20: Protective Dielectric Film
P: Pitch of Grid Protrusions
a: Grid-Protrusion Width (Width of Dielectric Layer, Width of Absorptive Layer)
b: Width of Reflective Layer

The invention claimed is:

1. A polarizing plate having a wire grid structure, the polarizing plate comprising:
a transparent substrate;
grid protrusions provided over the transparent substrate, arranged in an array having a pitch shorter than a wavelength of light in a band to be used, and extending in a predetermined direction; and
a protective film made of a dielectric material and covering a surface of the polarizing plate, the surface being configured to receive incident light,
the grid protrusions having a reflective layer, a first dielectric layer, an absorptive layer, and a second dielectric layer that are disposed in this order in a direction away from the transparent substrate, and
the reflective layer having a width that is smaller than each of a width of the first dielectric layer, a width of the second dielectric layer, and a width of the absorptive layer,
wherein the width of the first dielectric layer, the width of the second dielectric layer, and the width of the absorptive layer are substantially equal to one another,
wherein an absorption axis reflectance of the polarizing plate is minimized in the wavelength of light in the band to be used,
wherein the first dielectric layer, the second dielectric layer, and the absorptive layer each have a thickness such that, in response to the width of the reflective layer being equal to the width of the first dielectric layer, the width of the second dielectric layer, and the width of the absorptive layer, the absorption axis reflectance of the polarizing plate is minimized in a wavelength shorter than the wavelength of light in the band to be used, and
wherein a surface of the second dielectric layer is in contact with the protective film.

2. The polarizing plate according to claim 1, wherein the thickness of the first dielectric layer is 1 nm to 50 nm.

3. The polarizing plate according to claim 1, wherein the thickness of the absorptive layer is 10 nm to 50 nm.

4. The polarizing plate according to claim 1, wherein the transparent substrate is transparent to the wavelength of the light in the band to be used, and is made of glass, quartz, or sapphire.

5. The polarizing plate according to claim 1, wherein the reflective layer is made of aluminum or an aluminum alloy.

6. The polarizing plate according to claim 1, wherein the dielectric layer is made of a Si oxide.

7. The polarizing plate according to claim 1, wherein the absorptive layer is composed of Si as well as Fe or Ta.

8. The polarizing plate according to claim 1, having a surface covered with an organic water-repellent film, the surface being configured to receive incident light.

9. A method of manufacturing a polarizing plate having a wire grid structure and an absorption axis reflectance that is minimized in a wavelength of light in a band to be used, the method comprising:
forming a reflective layer over a transparent substrate;
forming a first dielectric layer on the reflective layer;
forming an absorptive layer on the first dielectric layer;
forming a second dielectric layer on the absorptive layer;
etching a resultant laminate in a selective manner to form, over the transparent substrate, grid protrusions arranged in an array having a pitch shorter than the wavelength of light in the band to be used, and extending in a predetermined direction; and
coating, with a protective film made of a dielectric material, a surface of the transparent substrate having the grid protrusions formed thereover, the surface of the transparent substrate constituting a surface of the polarizing plate, the surface of the polarizing plate being configured to receive incident light,
the etching including making a width of the reflective layer in the grid protrusions smaller than a width of the first dielectric layer in the grid protrusions, a width of the second dielectric layer in the grid protrusions, and a width of the absorptive layer in the grid protrusions; and
adjusting the width of the reflective layer in the grid protrusions such that the absorption axis reflectance of the polarizing plate is minimized in the wavelength of light in the band to be used,
wherein the width of the first dielectric layer, the width of the second dielectric layer, and the width of the absorptive layer are substantially equal to one another,
wherein the first dielectric layer, the second dielectric layer, and the absorptive layer each have a thickness such that, in response to the width of the reflective layer in the grid protrusions being equal to the width of the first dielectric layer in the grid protrusions, the width of the second dielectric layer in the grid protrusions, and the width of the absorptive layer in the grid protrusions, the absorption axis reflectance of the polarizing plate is minimized in a wavelength shorter than the wavelength of light in the band to be used, and
wherein a surface of the second dielectric layer is in contact with the protective film.

10. An optical apparatus comprising the polarizing plate according to claim 1.

* * * * *